US009392463B2

(12) United States Patent
Anand

(10) Patent No.: US 9,392,463 B2
(45) Date of Patent: Jul. 12, 2016

(54) SYSTEM AND METHOD FOR DETECTING ANOMALY IN A HANDHELD DEVICE

(71) Applicant: Tarun Anand, New Delhi (IN)

(72) Inventor: Tarun Anand, New Delhi (IN)

( * ) Notice: Subject to any disclaimer, the term of this patent is extended or adjusted under 35 U.S.C. 154(b) by 85 days.

(21) Appl. No.: 13/833,637

(22) Filed: Mar. 15, 2013

(65) Prior Publication Data

US 2014/0179270 A1 Jun. 26, 2014

(30) Foreign Application Priority Data

Dec. 20, 2012 (IN) .......................... 3935/DEL/2012

(51) Int. Cl.
 *H04M 1/66* (2006.01)
 *H04W 12/12* (2009.01)
 *H04L 29/06* (2006.01)
 *H04M 7/00* (2006.01)
 *H04M 15/00* (2006.01)

(52) U.S. Cl.
 CPC ........... *H04W 12/12* (2013.01); *H04L 63/1425* (2013.01); *H04M 7/0078* (2013.01); *H04M 15/47* (2013.01); *H04M 2203/6027* (2013.01); *H04M 2215/0148* (2013.01)

(58) Field of Classification Search
 CPC ..... H04W 12/12; H04W 12/06; H04W 12/08; H04L 63/1425; G06F 21/00; G06F 21/554; H04M 15/47; H04M 2215/0148; H04M 2203/6027; H04M 15/58; H04M 2215/0188
 USPC .................................. 455/410, 411; 340/5.31
 See application file for complete search history.

(56) References Cited

U.S. PATENT DOCUMENTS

| 8,145,561 | B1 * | 3/2012 | Zhu .................... G06Q 40/025 455/410 |
| 8,311,041 | B1 * | 11/2012 | Nerieri et al. ................. 370/390 |
| 2009/0249443 | A1 | 10/2009 | Fitzgerald et al. |
| 2010/0190474 | A1 * | 7/2010 | Rajguru .................... 455/412.1 |
| 2011/0016363 | A1 * | 1/2011 | Washio ........................... 714/57 |

OTHER PUBLICATIONS

Geo-Trace Modeling using n-grams for Anomaly Detection in User Behavior and User Location Prediction, Department of Electrical and Computer Engineering, Carnegie Mellon University, Dec. 2011, 39 pages.*
"Box-Jenkins Analysis", Professor Roy Batchelor, Cass Business School, City of London ESCP-EAP, Paris, 2004, 39 slides.*

(Continued)

*Primary Examiner* — Thai Vu
(74) *Attorney, Agent, or Firm* — Ladas & Parry LLP

(57) ABSTRACT

The inventive subject matter of the present disclosure provides a system and method for detecting anomalies in a handheld device based on a plurality of parameters that indicate current phone usage context, mobility pattern, or behavior of a handheld device. Anomalies in handheld devices can be a result of, but not limited to, lost or stolen phone, loss of information/data, change in calls being made, change in user mood, change in browsing pattern, sudden change in user location, or other such conditions. One aspect of the inventive subject matter includes detecting anomalies in a handheld device, specifically, detecting whether a phone has been lost or stolen, by considering one or more parameters of the handheld device that are indicative of current phone usage context, mobility pattern, or behavior of a handheld device.

14 Claims, 2 Drawing Sheets

(56) References Cited

OTHER PUBLICATIONS

Seneka Buthpitiya, et al; "n-gram Geo-Trace Modeling", Pervasive Computing, 9th International Conference, Pervasive 2011, San Francisco, USA, Jun. 12-15, 2011; pp. 97-114.

Gaurav Tandon, et al; "Spatio-temporal Anomaly Detection for Mobile Devices", Scholarship Repository at Florida Tech, URl: http://hdl.handle.net/123456789/7682(http://hdl.handle.net/123456789/7682); May 2, 2013; 10 pages.

* cited by examiner

SYSTEM AND METHOD FOR DETECTING ANOMALY IN A HANDHELD DEVICE

FIELD OF INVENTION

The present disclosure relates to handheld devices. More particularly, the present disclosure relates to monitoring changes in user's current device usage context, mobility patterns, or behavior of a handheld device to identify anomalies therein.

BACKGROUND OF THE INVENTION

In today's daily life, hand held devices such as mobile phones, PDA's, tablets have become essential for communication, information storage, and access to multiple services and applications. Until few years back, mobile phones were used only for communication purpose such as for sending messages, calling other users, receiving calls, and the like. As mobile devices and technologies embedded therein have developed and evolved, usage of the devices for storing different data, text, audio, photos, etc has increased multifold. With smart phones now storming into the market, various advanced features, which were once only provided by computers and laptops, are now being provided to users through such smart phones. Furthermore, along with path-breaking development in handheld device technologies, threat of anomalies such as from data theft, device theft, viruses, interne based threats, are also increasing.

Along with the development in handheld device technologies, development related to safety and security of handheld devices is also gaining prominence. For instance, it is usually the user who goes to a police station and complains about his phone being lost or stolen and it is based on this information that the police takes the next action. Further, users typically realize about the phone being stolen or lost only after 2-3 days of the event happening and therefore by the time the user registers a complaint, it is already too late. Existing security methods also include tracking mobile phones based on SIM cards present in phones. However, this method also has drawbacks as the thief may remove the SIM card from the mobile phone and not allow it to be remotely accessible. Yet another method includes assigning a password to the mobile phone, which needs to be entered every time the phone is started. This method also has drawbacks as the thief is generally able to reset the phone settings or can hack into the phone through other alternative means. Furthermore, advanced security methods such as finger prints, signature based intrusion detection systems, face recognition systems, voice based verification and the like have also been proposed and implemented for improving the security of phone. However, these security methods too have many drawbacks and principally function post the phone has been stolen, which actually the users come to discover about only after many hours or days of the mishap. Recent smart phones, PDA's and tablets have been incorporated with advanced algorithms, which are configured to monitor user's usage pattern based on user's location and record the location at a predetermined time period and match with usage history stored in a database. Upon finding any variation in the usage behavior, the algorithm identifies or detects that the phone has been stolen or lost and generates an alert to the user by sending a mail or message to user specified contacts. Certain modifications and changes have been made in the algorithms to increase the security of the phones and further improve the efficiency of early detection of such an anomaly.

An article published by Buthpitiya et al. titled "n-gram Geo-Trace Modeling", discusses an algorithm present in a smart phone that can sense location of the smart phone and detect anomalies in user behavior to detect theft of the phone. The algorithm records user location data at particular time period and identifies GPS coordinates such as longitude and latitude of the location. The location coordinates are quantized and partitions of equal sized squares are made. Quantizing can be carried out to identify smaller granular location coordinates. For a particular fixed time period, user location is then identified and labeled with a tag and stored in a database. Stored tags are compared to the current calculated user position for the particular time period to detect anomalies in user's location, wherein if variation in the user location is identified beyond a threshold, the system identifies that the smart phone has been stolen or lost.

Another, more generic example includes an article published by Tandon et al. titled "Spatio-temporal Anomaly Detection for Mobile Devices", which discusses an algorithm that detects anomalies in mobile devices. In the algorithm of Tandon, mobile device location is captured by cell towers and transmitted to a centralized server. All ID's received from plurality of cell towers are observed and learned over a period of time. If the phone is stolen and used by a thief, it indicates different location and time, upon which anomaly flag is raised. The network operator can lock the phone identifying that the phone is stolen and the phone can be unlocked by network operator or by the user by entering PIN.

U.S. patent application 2009/0249443 to Flitzgerald et al. titled "Methods for monitoring the unauthorized use of a device" filed internationally on Apr. 1, 2008, discusses detecting stolen, lost, or unauthorized use of a device and further discusses altering the functionality of the device in response to such use by identifying the location. The current location of the device is compared with a list of locations stored in a database of a server where the device is allowed to be operated.

However, none of the above systems and methods take into account user's phone usage context such as SMS interactions, calling interactions, email interactions, browsing patterns, among others and mobility patterns such as location coordinates with respect to time so as to detect an anomaly in the handheld device and instead merely rely in changes in location to detect such an anomaly, which leads of lower overall efficiency, lag in anomaly detection, and low accuracy in anomaly detection.

Furthermore, existing systems and methods focus on generating bounding regions for anomaly detection along with learning geo-tracks of people, which make the existing solutions computationally expensive and time consuming. Few systems also use route modeling that deal with additional attributes such as speed and direction information which are generally not available on mobile phones.

There is therefore a need for a system and method that can, with higher efficiency and accuracy, detect anomalies in a handheld device based on current device usage context, mobility pattern, or behavior of a handheld device.

OBJECTS OF THE INVENTION

An object of the invention is to efficiently and accurately detect anomalies in handheld devices.

Another object of the invention is to detect anomalies in a handheld device based on current device usage context, mobility pattern, or behavior of a handheld device.

SUMMARY OF THE INVENTION

The inventive subject matter of the present disclosure provides a system and method for detecting anomalies in a handheld device based on a plurality of parameters that indicate current phone usage context, mobility pattern, or behavior of a handheld device. Anomalies in handheld devices can be a result of, but not limited to, lost or stolen phone, loss of information/data, change in calls being made, change in user mood, change in browsing pattern, sudden change in user location, or other such conditions. One aspect of the inventive subject matter includes detecting anomalies in a handheld device, specifically, detecting whether a phone has been lost or stolen, by considering one or more parameters of the handheld device that are indicative of current phone usage context, mobility pattern, or behavior of a handheld device.

In an embodiment, the inventive subject matter includes an anomaly detection system operatively coupled to a handheld device, wherein the anomaly detection system comprises a database, and an anomaly detection engine, which is operatively coupled with the database. The handheld devices can include mobile phones, PDA's, touch-enabled computing devices, smart phones, tablets, or other such devices. The database can be configured to store various parameters related to a handheld device such as user location information (longitude and latitude), calling (incoming and outgoing) information, messaging (incoming and outgoing) information, emailing (incoming and outgoing) information, browsing information, profile and phone settings, background theme setting, calendar information, caller ring back tone information, phone directory information, among other allied parameters that can help in understanding the mobility patterns, user's current usage context, or behavior of the device/phone over a defined period of time such that a pattern or structure of any of the parameter can be formed. Such parameters can help define the manner in which users handle and use their handheld devices, their device preferences and settings, calling or browsing or messaging or information sharing patterns, among other contextual information. The parameters can be configured to store information thereof in the database for a defined period of time, wherein such time can be optimized by the user or can automatically be configured by the anomaly detection engine.

In an embodiment, anomaly detection engine can be configured to access the database so as to select a plurality of parameters and generate one or more indexes for one or a combination of selected parameters, wherein each index can be calculated as principal component of their corresponding parameter(s). For instance, a first index can be formed for location parameters, namely latitude and longitude, and a second index can be formed for calling parameters which comprise information/pattern relating to incoming calls, outgoing calls, missed calls etc stored with respect to time.

A time series model can be fitted on each index, wherein information/value of each selected parameter over a defined period of time can be analyzed and assessed through the time-series model to derive user's contextual and mobility pattern information relating to the parameters and evaluate whether the time-series is stationery or whether there exists seasonality in the parameter pattern.

The anomaly detection engine can further be configured to detect outlier observations of each index by using the time series model fitted on the respective index. In an exemplary implementation, outliers can be computed from the fitted time series model based on Box-Jenkins method, wherein residuals from the time-series fitted model are computed for each observation such that the residuals follow a normal distribution with mean zero and variance of one. Magnitude of the residuals can then be inspected to determine if the value is above a defined threshold/cut-off value, in which case, the observation is considered as an outlier.

The anomaly detection engine can further be configured to introduce dummy variables for the time series fitted model and assign dummy variables to one or more observations of indexes based on whether the specific observation is an outlier or not and thereby classify the observations for one or more indexes under consideration. For instance, in case an observation is detected to be an outlier; the dummy variable value is assigned as 1 and for observations that are normal; the default dummy variable value is 0. The anomaly detection engine can further be configured to, based on dummy variable as the response variables; and time and selected parameters as explanatory variables, fit one or more of logistic regression model, classification tree model, or SVM classifier model to finally detect whether the anomaly, specifically whether location of the handheld device, is normal or not. In an exemplary embodiment, final decision is taken by the decision unit to declare whether the current location of the handheld device is normal or not and whether the phone has been stolen or lost.

In an embodiment, one or more parameters can be selected or filtered by the anomaly detection engine from the database such that the parameters contain information specific only to the anomaly being detected. For instance, if an anomaly relating to whether the phone has been lost or stolen is to be detected, SMS parameters can preferably be filtered to include "location indicative" incoming and outgoing SMS's. In another embodiment, anomaly detection engine can further be configured to analyze and evaluate each parameter over a defined period of time to identify and filter meaningful and contextual pattern information of the parameter, and set an index on the parameter after retrieval of the contextual pattern information for higher accuracy of anomaly detection.

Each index can relate to and represent one or more contextual parameters selected from the database, wherein a time-series model can be fitted on the index to help assess a pattern or structure in the behavior of the index over a defined period of time, based on which outlier observations can then be detected. Outlier observations can, through dummy variables, help evaluate whether a particular anomaly has taken place with the handheld device. Multiple indexes, representing a plurality of parameters, can similarly be implemented in parallel to yield outlier observations for a common anomaly to be detected, and their respective outlier observations at a particular time instance can then be compared or evaluated/assessed through one or more of logistic regression model, classification tree model, or SVM classifier model to finally detect whether the anomaly exists.

Another aspect of the inventive subject matter is considered to include a method for anomaly detection in a handheld device. The method can include retrieving, through an anomaly detection engine, a plurality of parameters from a database and analyzing each parameter, over a period of time, to identify contextual pattern information about the user's usage of the device. Exemplary parameters stored in the database can include user's location information (longitude and latitude), calling (incoming and outgoing) information, messaging (incoming and outgoing) information, emailing (incoming and outgoing) information, browsing information, profile setting, background theme setting, calendar information, caller ring back tone information, phone directory information, among other allied parameters which help in understanding the mobility patterns, user's current device usage context, and behavior of the device/phone over a defined period of time.

The method can further include getting one or more indexes based on one or a combination of parameters, wherein each index can be the principal component of the parameters it represents. The method can further include fitting a time series model on each index by plotting the index with respect to a time interval, wherein the time interval can be stored in the system database alongside each parameter value. The time-series model represents the change in parameters with respect to time and can help assess the pattern and behavior of the parameters as to determine whether the time-series on the index is stationary or has certain seasonality. The method can further include obtaining outlier observations by using the fitted time series model based on whether an observation's residual value has a magnitude below a cut-off value.

The method can further include introducing a dummy variable for all observations such that the dummy variable can indicate whether the observation is an outlier or not. In an instance, the value of dummy variable for an outlier observation can be 1 and for a normal observation can be 0. The method can then take a decision as to whether the phone has been lost or stolen using one or a combination of logistic regression model, classification tree constructing model, and support vector machine (SVM) classifier model, based on dummy variable as a response variable; and time and selected parameters as explanatory variables. In an embodiment, using one or more of logistic regression model fitting, classification tree constructing model, and support vector machine (SVM) classifier model can help improve the accuracy of anomaly detection. In another embodiment, usage of one or more indexes, wherein each index corresponds to a category of parameters such as SMS parameters, calling parameters, or location parameters, can help assess multiple contextual patterns simultaneously, thereby improving the efficiency of anomaly detection.

Various objects, features, aspects and advantages of the inventive subject matter will become more apparent from the following detailed description of preferred embodiments, along with the accompanying drawings in which like numerals represent like components.

DETAILED DESCRIPTION OF THE INVENTION

It should be noted that while the following description is drawn to a system and method for identifying anomalies in a handheld device, various alternative configurations are also deemed suitable and may employ various computing devices including servers, interfaces, systems, databases, agents, peers, engines, controllers, or other types of computing devices operating individually or collectively. One should appreciate the computing devices and handheld devices comprise a processor configured to execute software instructions stored on a tangible, non-transitory readable storage medium (e.g., hard drive, solid state drive, RAM, flash, ROM, etc.). The software instructions preferably configure the handheld device to provide the roles, responsibilities, or other functionality as discussed below with respect to the disclosed system. In especially preferred embodiments, the various servers, systems, databases, or interfaces exchange data using standardized protocols or algorithms, possibly based on HTTP, HTTPS, AES, public-private key exchanges, web service APIs, or other electronic information exchanging methods. Data exchanges preferably are conducted over a data bus, a packet-switched network, internet, LAN, WAN, VPN, or other type of packet switched network.

The following discussion describes the inventive subject matter with respect to various parameters of a handheld device. One skilled in the art will recognize that the inventive subject matter can scale as necessary to any number of parameters, patterns, and indexes without departing from the inventive subject matter.

Figure 1:
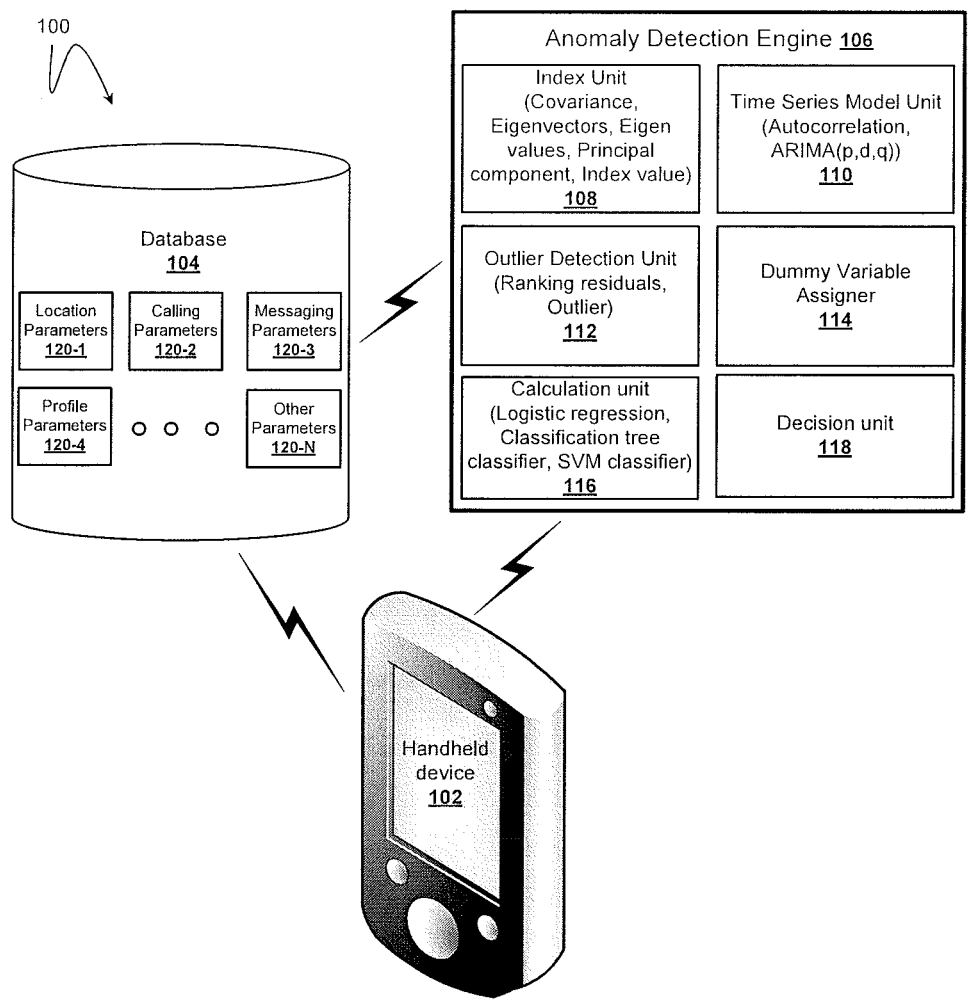
FIG. 1 illustrates a schematic of an anomaly detection system in a handheld device comprising a mobile phone, a database, and an anomaly detection engine that are operatively coupled to each other.

In FIG. 1, an anomaly detection system 100 comprises of a handheld device 102, a database 104 operatively coupled to the handheld device 102, and an anomaly detection engine 106 operatively coupled to the handheld device 102 and/or the database 104. The handheld device 102, the database 104, and the anomaly detection engine 106 can be operatively connected to each other by a data bus or by a wired/wireless network. The handheld device 102 can be selected from, but not limited to, a mobile phone, PDA, smart-phone, tablet and like communication devices. The database 104 can be a memory device, which can be selected from, but not limited to, a database of a server, hard drive, RAM, ROM, flash memory, CD, DVD, floppy disk, USB drive and the like, and is configured to store one or more parameters 120-1, 120-2 . . . 120-N, collectively referred to as parameters 120 hereinafter, of the handheld device 102. Parameters 120 can include features or applications present in the handheld device 102, which are operated and used by a user of the handheld device 102, and can include, but are not limited to, location based parameters such as longitude and latitude; SMS or message parameters such as incoming SMS's, outgoing SMS's, incoming MMS's, chat history, outgoing MMS's etc.; calling parameters such as incoming calls, outgoing calls, missed calls, call duration, call location etc.; email parameters such as incoming emails, outgoing emails, etc.; browsing parameters such as websites visited, duration of visit, web pages visited/bookmarked etc; phone profile parameters such as ring tones, caller ring back tone, profile pictures; application parameters such as kind of applications installed, frequency of usage of each application, etc; among all other possible parameters.

It would be appreciated that although the following description for the system 100 that is configured to detect anomalies in a handheld device is described with respect to a mobile phone, this is merely an embodiment and does not limit the scope of the invention in any manner and any other applicable computing device can be used for implementing the proposed system 100. Furthermore, in the present embodiment and disclosure, lost or stolen phone detection has been taken only as an exemplary anomaly intended to be detected. Any other anomaly associated with the handheld device 102 can also be used and implemented using the system 100 of the proposed inventive subject matter.

It would be further appreciated that each parameter can be represented by any information or attribute associated with the parameter. For instance, each incoming SMS parameter can be represented by one or more attributes such as content of the incoming SMS, sender of the SMS, recipient of the SMS, time of receiving the SMS, among other such attributes that can also be referred to as sub-parameters, wherein such sub-parameters can define and help understand and analyze the respective parameter in complete details.

The database 104 can either be present in mobile phone 102 as a memory unit or can be present external to the mobile phone/handheld device 102 in a remote location or as any of the storage units mentioned above and can be operatively coupled to the mobile phone 102 via a data bus or via wired or through a wireless network such as LAN, WAN, VPN and the like.

The anomaly detection engine 106 can either be present within the mobile phone 102 or can be present outside the mobile phone 102 on a computing device and connected to the phone 102 via a network. Although, the present disclosure has been described with respect to location parameters 120-1 being the parameter 120, any other parameter or a combination thereof can be used for detecting anomaly in the device 102. For instance, along with location, message parameters 120-3, and calling parameters 120-2 can also, individually or collectively, be used for detecting a common anomaly such as detecting lost/stolen phone.

Anomaly detection engine 106 can be configured to derive user's phone usage context, mobility patterns, and behavior of the phone based on one or more parameters stored in the database 104 and use such usage context and mobility pattern to detect presence of anomalies in the mobile phone 102. Phone usage context can include analysis of the manner in which a user uses various features such as messaging, calling, browsing on the phone 102 along with the content being used, presented, created, and shared by the user. Phone usage context can store an extensive amount of contextual information about the phone settings and user's behavior on the phone 102, as a result giving a significant data set of content and information that can be analyzed for identifying meaningful information about the user and his mobile usage behavior. Mobility pattern, on the other hand, can be physical travel of the user (e.g., work, leisure, family life, physical travel of objects (e.g., products to customers), imagination travel (e.g., memories, books, movies), visual travel (e.g., internet surfing on Google Earth), communication travel (e.g., person-to-person messages via telephones, letters, emails, etc.) and the like, which can be collectively or individually analyzed to derive meaningful information about user's mobility. Anomaly detection engine 106 can detect anomalies in the mobile phone 102 by considering physical travel of the user as the mobility pattern and calling/messaging pattern of the user as contextual information to make a structure/pattern of user's overall location characteristics, and using meaningful information from selected parameters to make a conclusion of whether the phone has been lost or stolen. It would be appreciated that location or mobility pattern, individually, might not be, in certain cases, an accurate indicator of device anomaly and therefore a combination of mobility patterns, device behavior and settings, and user's phone usage context can, when combined together, detect an anomaly with higher accuracy.

The current location information can either be recorded from mobile phone 102 (using GPS) or a specialized GPS hardware can be used to detect location information of the mobile phone 102. While some specialized geo-tracking devices are capable of providing a greater amount of information about the user's movements (such as velocity), we assume that the only information available to our model is raw, time-stamped GPS coordinates (longitude and latitude). The location information including latitude and longitude can be stored in database 104 as location parameters 102 for further reference.

In a preferred embodiment, anomaly detection engine 106 can access database 104 and receive location information i.e., latitude and longitude values from location parameters 120-1, and can send the latitude and longitude values to an index unit 108. The latitude and longitude information, as part of location parameter 120-1, can be accessed at a particular time period t, and the time period t can also be stored in database 104 for future reference, and therefore the location parameter 120-1 can store location coordinates of the phone 102 for a defined or desired period of time. The index unit 108 can receive the latitude and longitude values and construct a principal component as an index from the latitude and longitude information. Choosing the principal component, based on principal component analysis (PCA), as an index allows a linear combination of latitude and longitude that has maximum variance to be represented and further allows reduction in dimensionality from n dimensions to a single dimension of index I. In another embodiment, as also mentioned above, one or more indexes can be constructed based on one or a combination of parameters. For instance, a "location index" can be constructed based on location parameters comprising latitude and longitude values, and a "message index" can be constructed based on messaging parameters 120-3 including incoming and outgoing messages (SMS's, MMS's, emails, etc.). Such index generation can therefore help in reducing the m dimensions of messaging parameters 120-3 to a single dimension represented by "message index". In yet another embodiment, the one or more indexes can also be combined together in a desired matter to help create a single index representative of all selected parameters 120 from the database 104.

Continuing the single index embodiment for exemplary illustration of the system 100, in the process of getting an index I for parameters latitude and longitude, each new entry of latitude (new_latitude) and longitude (new_longitude) can be processed by the index unit 108 to subtract new_latitude and new_longitude from mean of latitude (mean_latitude) and mean of longitude (mean_longitude) respectively so as to obtain x1 and x2, i.e., x1=new_latitude−mean_latitude, and x2=new_longitude−mean_longitude. In an implementation, x1 and x2 can be grouped together as (x1, x2) and the index unit 108 can calculate variance of x1 and x2 and covariance of (x1, x2) and accordingly calculate covariance matrix T. Calculation of covariance matrix T allows the index unit 108 to analyze and understand how latitudes and longitudes vary with respect to each other and their means. The covariance matrix T can be represented as:

$$T = \begin{pmatrix} V(x1) & COV(x1, x2) \\ COV(x1, x2) & V(x2) \end{pmatrix}$$

Covariance matrix T includes both variance and covariance of x1 and x2. For the obtained covariance matrix T, index unit 108 can calculate a plurality of possible eigenvectors and eigenvalues, wherein eigenvectors and eigenvalues together represent the matrix in a simplified manner. Single matrix T can have n number of eigenvectors and eigenvalues. The index unit 108 can be configured to then select the eigenvector with highest eigenvalue from among all eigenvectors and eigenvalues, and the selected eigenvector with highest eigenvalue can be referred to as the principal component, which basically maximizes the variance of the new observations (latitude and longitude values). The index unit 108 can therefore perform principal component analysis (PCA) to calculate the eigenvector with highest eigenvalue for the covariance matrix T of x1 and x2 containing latitude and longitude information. The index unit 108 can calculate an index value I for latitude and longitude by using a formula: I=e1*latitude+e2*longitude, wherein e1 and e2 are elements of eigenvector with highest eigenvalue. The calculated index I, in the form of a unit vector, can thus be obtained through simplified information about user's mobility pattern based on latitude and longitude coordinates present in parameters 120-1 with respect to time.

In an embodiment, instead of a single dimension, the index I can also be represented in two or more dimensions. For instance, for representing index I in two dimensions, the largest principal component PC_1 of the data set can first be computed and PC_1 can then be subtracted from all the data points to obtain a flattened dataset that has no variance along PC_1. Principal component of this flattened dataset can give PC_2 and as a result PC_1 and PC_2 would represent the complete parameter set 120 in two dimensions through index I.

In an embodiment, anomaly detection engine 106 can send the index I to a time series model unit 110. The time series model unit 110 can use the index I to identify behavior or changes occurring in index I with respect to time by fitting the index I in a time series model. The time series model unit 110 can be configured to receive index I and plot the index with respect to time. The anomaly detection engine 106 accesses the database 104 and retrieves time period data t stored in location parameters 102-1 for the respective latitude and longitude values. The accessed time period data t can be provided to the time series model unit 110 for identifying the behavior of index I with respect to time and further detecting whether the pattern or structure followed by the index I, which is representative of location parameters (latitude and longitude), over a defined period of time, is stationery or presents some seasonality. A stationery time series represents observations whose mean, variance, and autocorrelation function do not change over time, whereas these attributes change for a non-stationery time series. In an implementation, for detecting whether a time series is stationery, a sample autocorrelation i.e., covariance can be calculated for the index I for different time lags t+h, wherein t is the time period of the index I and h is the time lag. A graph can be plotted for the index I against time period t and time lag to observe whether the graph is stationary or not. In an implementation, if the autocorrelation of index I lies within a defined limit, it can be inferred that the time-series is stationary and if the autocorrelation of index I lies outside the limit, it can be inferred that the time-series is not stationary. The limit threshold for autocorrelation detection of index I can either be user defined and configurable or can be automatically set based on the parameter(s) 120 under consideration.

In case the autocorrelation of index I lies outside the defined limit, which is indicative of the time-series not being stationery, the time series model unit 110 can be configured to calculate differencing of the time series I(t)−I(t−d), as a new time series, wherein t is the time period and d is 1, 2, 3 . . . up to recent period. This new time series of index I can then again be checked for autocorrelation, and whether the series is stationery. Differencing of the time series can also be implemented multiple times to non-stationery time series to make the series stationary. Non-stationery time series fitted model can also be removed by fitting an appropriate trend curve.

For the obtained autocorrelation value of index I, the time series model unit 110 can find the order of the time-series by applying Autoregressive Integrated Moving Average (ARIMA) (p, d, q) model, wherein ARIMA (p, d, q) model is a time series analysis model with autoregressive process having order p (AR(p)), moving average process having order q (MA(q)), and d represents the number of times the time-series has been differenced. ARIMA represents a AR(p)–MA(q) process that has been differenced d times to identify the order of the time series. In the present embodiment, ARIMA (p, d, q) model can be used by the time series model unit 110 for better understanding of the index I with respect to time t and to calculate order for index I. Depending on the time-series model, indexes and parameters involved, ARMA (autoregressive moving average) model can also be incorporated to compute the order of the time-series.

Data obtained after calculating the order of index I using ARIMA (p, d, q) model provides clearer information with respect to time. The time series model unit 110 can send the calculated order of the index I to an outlier detection unit 112. An outlier can be referred to an object, which has fallen out of the regular path when compared to other objects that are on the regular path due to various factors affecting on it. The outlier detection unit 112 can be configured to receive each observation of the index I fitted on the time series model and can identify outlier observation in the index I by using one or a combination of known outlier detection methods.

In an implementation, Box-Jenkins methodology can be implemented by the outlier detection unit 112 to perform calculations for identifying outliers, wherein calculations include determining residual values of observations of index I. The outlier detection unit 112 can be configured to compute residual values for each observation under index I by the following formula: Residuals=Fitted Value−Observed Value. The residuals can provide actual difference between the value calculated by the time series of the index and the observed value to understand the magnitude of deviation from the time series values. Residuals obtained for each observation under index I can be ranked by the outlier detection unit 112 to identify ranking of the residuals. The process of ranking residuals plays an important role to identify outliers, wherein the obtained ranks can be plotted on a graph against time period and a cutoff point can be set on the graph for the rankings. The rankings which lie within the cutoff point can be considered as regular or normal observations and the rankings that lie outside the cutoff region, can be observed as unusual or outlier observations. The outlier detection unit 112 can, for each observation, based on its residual rankings, determine whether the observation is an outlier or not. The outlier detection unit 112 can also be configured to transmit all observations under index I to a dummy variable assigner 114. It would be appreciated that the cutoff region can be designed and configured based on one or more of anomaly to be detected, parameters 120 under consideration, one or more indexes and parameters on which they are computed, desired level of false-positive outcome of detected anomalies, among others.

In an instance, a learning data set for index I can be constructed for 6 months with observations of the phone location history being recorded, through latitude and longitude values, and stored as location parameters 120-1 in database 104. The observations can be taken say every 5 minutes and a time series model can be fixed on all the observations with respect to the 6 months period, wherein the graph of the time series model would indicate the level of seasonality and help form a pattern of change in mobility. For instance, the pattern could indicate that on 80% of the working days (Monday-Friday), travel of a user is between 3-4 locations, which are 25 miles apart and on weekends, 75% of the travel of a user is between 5-6 locations, which are 60 miles apart from each other. In such a case, in case the autocorrelation of the time-series is required to be more than 70%, the present series would be considered as stationary and no differencing in series is required. Based on the stationery time series model fitted on location index, residuals can be computed for each incoming observation to determine if the observation is above or below a defined cut-off. Cut-offs can be designed and configured for each parameter or event or even based on the time-series pattern being followed. For example, the cut-off value, in the present instance, can be different for working days and different for weekends, wherein the cut-off for the working days could be >45 miles and <500 miles (indicating that the user may have flown down to another city), and in case the incoming observation A indicates the current location C to be 120 miles, the observation can considered as an outlier. Furthermore, in case another parameter such as messaging parameter 120-3 is also considered in the system, a message_index can be computed and the same process can be followed to detect an outlier. In such a case, although, with respect to location parameter 120-1 and location_index, the observation A is considered as an outlier, the same might not be an outlier with respect to message_index if the SMS pattern indicates that the user was intended to travel to a location C which is 120 miles away from current location. Therefore, one or more indexes on one or a combination of parameters can generate a more meaningful and accurate output from the outlier detection unit 112.

In an implementation, a general outlier detection model, as shown below, can also be implemented by the outlier detection unit 112 for accurately detecting the outlier observations. $Y_t=Z_t+I_t(d)W_0W(L)/\delta(L)$ indicates an outlier detection model, wherein $Z_t$ is a regular ARIMA model, $W(L)$ and $\delta(L)$ are lag polynomials, $I_t(d)$ is an indicator variable, Y indicates whether the observation of timestamp t is an outlier or not, and d is the timing of an outlier.

The dummy variable assigner 114 can be configured to receive all observations under index I from the outlier detection unit 112 and assign dummy variables to each observation, wherein dummy variables can be Boolean values or binary values such as 0 and 1. The dummy variables are configured to help identify, classify, or differentiate outlier observations from normal observations and are used as an input to detect an anomaly. Dummy variable value Y can be assigned as 1 to an outlier observation and can be 0 as default for all other observations.

It is to be noted that each detected outlier may not create an anomaly and therefore it is important to process the outliers with respect to time, concerned parameters, and other observations to detect whether an outlier actually has created an anomaly such as whether a specific outlier observation indicates that the phone has been lost or stolen. The calculation unit 116 can be configured to receive all observations under index I that are assigned with dummy variables and perform statistical calculations and regression analysis for received index I with respect to time. These statistical calculations and analysis can help detect whether the observed behavior is an anomaly or a mere change observed due certain influential factors such as, but not limited to, weather, lack of network, sudden changes in location and the like. Calculation unit 116 can be configured to apply a logistic regression model using the dummy variables as response/outcome variables; and using time and parameters 120 as explanatory variables, which can help understand and measure relative movement of index I with respect to time and obtain probabilistic score of the same. The probabilistic score obtained for index I with respect to time can give a clear idea about the location and can help understand whether the location is known to the user. Further, in the regression model, a dummy variable with a value of 0 (normal observation) will cause its coefficient to disappear from the equation. Conversely, for a dummy variable with value 1 (outlier observation), coefficient functions as a supplemental intercept, because of the identity property of multiplication by 1. This type of specification in a linear regression model is useful to define subsets of observations that have different intercepts and/or slopes without the creation of separate models. Logistic regression can either be bi-nomial i.e. configured to predict outcome in only two possible ways, or can be multinomial i.e. configured to predict outcome in many possible ways. For the present disclosure, bi-nomial logistic regression can be used to identify whether the phone has been lost or stolen. Observations of multiple indexes can be formed in the regression equation and evaluated together to get the final decision on anomaly.

The calculation unit 116 can further be configured to construct a classification tree for observations under index I with respect to time. Classification tree, also commonly referred to as regression tree or decision tree, is well known in statistics, data mining, and machine learning as a predictive model, which maps observed values (observations) of an index to a target value and can be helpful to visually and explicitly represent data in decisions. The classification tree can predict the value of a target variable based on several input variables, and in the present case can take the dummy variable as the response variable; and time and parameters 120 as explanatory variables. The classification tree can classify the observations and assign a percentage to the outcome based on the observations, wherein the percentage can help detect an anomaly based on the explanatory variables.

The calculation unit 116 can further be configured to construct a support vector machine (SVM) classifier for the observations under index I. Support vector machines (SVM's) are supervised learning models in regression analysis associated with algorithms that can analyze data and recognize patterns in the analyzed data to as to eliminate influences of irrelevant predictors. SVM can take a set of input data such as time, latitude, and longitude as explanatory variables; dummy variables as response variables; and give a binary linear classifier as output. SVM algorithm can build a model and then represent observations in space after calculation and map the observations to predict the category to which they belong based on the side of the gap they fall on with respect to the built model.

In an implementation, any of logistic regression, classification tree, and SVM classifier can be used to take a final decision on the anomaly, whereas, in another implementation, two or more of the abovementioned models can be combined to reduce the error in decision as to whether the current location of the handheld device 102 is normal or not. The one or more models can also be chosen based on the anomaly to be detected such that the combination of models for detecting whether the phone has been lost or stolen can be different from the models chosen for detecting whether the phone has been infected by virus.

As mentioned above, other device parameters 120 can also, individually or collectively, be used to detect anomaly with the handheld device 102. For instance, messaging parameters 120-3 comprising of incoming and outgoing messages in the form of SMS's, MMS's, or emails can also be used for detecting anomaly, separately or along with location parameters. An index, such as message_index, can first be retrieved from the principal component based on the messaging parameters 120-3 and a time series model can be fitted on the message data set learned over a defined period of time. A time series can then be evaluated as to whether it is stationery with respect to an autocorrelation value, wherein in case the fitted time series is determined to be stationery, an order of the time series can be computed and residual for each observation can be computed, ranked, and compared with a cut-off value to detect an outlier. It is to be noted that during detection of a particular anomaly, at a given timestamp T1, for an observation O1 of an index such as location_index that is identified to be an outlier, another observation O2 at the same timestamp T1 may not be an outlier for another index such as message_index. Therefore, dummy variables across observations of different indexes can have different values at a particular timestamp. Implementation of the system 100 using multiple indexes and parameters can therefore assist in reducing the error while detecting an anomaly in a device. Furthermore, multiple parameters such as message parameters 120-3, calling parameters 120-2, and location parameters 120-1, or parts thereof, can also be combined together through a model to form a single index that is representative of all the parameters that indicates user's device usage context, mobility pattern, and behavior of the device 102.

In an embodiment, one or more indexes, each corresponding to one or a combination of parameters 120, can be combined through a defined model to obtain an index I that is representative of all selected parameters for detecting anomalies in a mobile phone 102. Furthermore, while forming an index based on parameters 120 such as calling parameters 120-2, a sub-set from the parameters 120-2 can also be selected. For instance, an index can also be formed only on the incoming call values and not on the outgoing call values, which can help optimize the system and make it computationally inexpensive.

Figure 2:
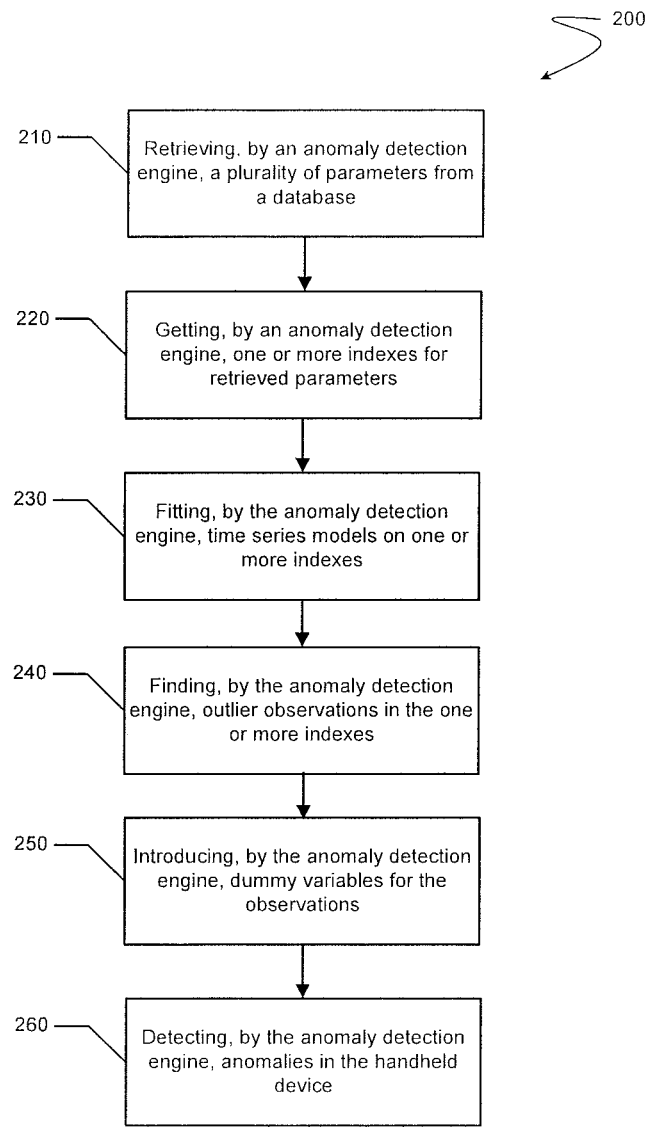
FIG. 2 is an example method of anomaly detection in a mobile phone.

FIG. 2 presents a method 200 for detecting anomalies in a handheld device. The handheld device 102 can include, but not limited to, mobile phone, PDA, smart-phones, tablet and the like. For illustration purpose, the present embodiment has been described with respect to mobile phone 102. Step 210 includes getting an index from one or more parameters 120, wherein the parameters 120 can include features or applications present in the handheld device 102, which are operated and used by a user of the handheld device 102, and can include, but are not limited to, location based parameters such as longitude and latitude; SMS or message parameters such as incoming SMS's, outgoing SMS's, incoming MMS's, chat history, outgoing MMS's etc.; calling parameters such as incoming calls, outgoing calls, missed calls, call duration, call location etc.; email parameters such as incoming emails, outgoing emails, etc.; browsing parameters such as websites visited, duration of visit, web pages visited/bookmarked etc; phone profile parameters such as ring tones, caller ring back tone, profile pictures; application parameters such as kind of applications installed, usage of each application, etc; among all other possible parameters. Database 104 can be configured to store the parameters 120 along with their values with respect to time such that an analysis of each parameter over a defined time interval can give a user context or mobility pattern relating to usage of the phone 102. The index I can be obtained from the one or more parameters 120 based on computation of a covariance matrix T of the parameters and computing eigenvectors and eigenvalues of the matrix T, wherein eigenvector with highest eigenvalue is the principle component (PC) and PC represents the index I.

Step 220 includes fitting a time series model on index I. Index I, which is representative of one or more parameters 120, can be plotted against time to identify whether the obtained time series model is stationery or follows a particular seasonality/pattern. Autocorrelation of the time series can be computed across time lags and checked for whether the autocorrelation values are within a defined limit. Fitting a time series model on a plurality of indexes can help assess the pattern of multiple parameters for a particular user for a defined period of time and all such time series models across indexes can be subsequently mapped to each other to assess whether a particular anomaly actually exists and is consistent across parameters.

Step 230 includes finding outliers in observations fitted in the time series model on index I. Residuals of observations can first be calculated as Fitted values–Observed values and then ranked in order of their magnitude. If the magnitude of a residual is within a defined cutoff region, the observation can be declared as normal, whereas if the magnitude of a residual is beyond the cutoff region, the observation can be declared as an outlier.

Step 240 includes associating dummy variables with observations of index I based on whether such observations are outliers. Dummy variables can be Boolean or binary values, and can, in an instance, be configured to associate a value of 1 for an outlier observation and 0 for a normal observation.

Step 250 includes performing statistical computations to detect anomalies in handheld devices 102 based on dummy variables computed in step 240 and observations that represent behavior of various parameters 120 over a defined period of time. The computations can be done based on one or more of logistic regression, classification tree, and simple vector machine (SVM) models, wherein the dummy variables are considered as responses variables; and time and parameters (such as latitude and longitude) are considered as explanatory variables. Multiple models can be used based on the anomaly to be detected, number of indexes under evaluation for anomaly detection, and the number of parameters that each index represents.

Step 260 includes making a decision as to whether an anomaly exists in a handheld device 102 based on computations done in step 250.

The method 200 described herein can be applied to all other embodiments described above such as, but not limited to, considering latitude and longitude, or location information as parameter, considering calling pattern as parameter, considering messaging pattern as parameter, combining location information and messaging pattern as parameter and the like.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

ADVANTAGES OF THE INVENTION

The proposed invention efficiently and accurately detects anomalies in handheld devices.

The proposed invention detects anomalies in a handheld device based on current device usage context, mobility pattern, or behavior of a handheld device.

I claim:

1. A system for detecting anomaly in a hand-held device comprising:
   a memory storing observations of one or more parameters with respect to time, wherein said parameters are based on one or more of user's mobility pattern, device usage context, messaging-based parameters, calling based parameters, email based parameters, browsing based parameters, phone profile based parameters, application based parameters, and device behaviour;

a processor executing instructions stored in a storage device including:

an anomaly detection engine coupled with the memory and configured to select and extract a first set of parameters, wherein said anomaly detection engine comprises:

an index unit configured to construct one or more indexes based on said first set of parameters, wherein construction of said one or more indexes enables index values being associated with each of said first set of parameters;

a time series model unit configured to fit a time-series on each constructed index;

an outlier detection unit configured to detect outlier observations for each index based on said fitted time series model;

a dummy variable assigner configured to associate each observation with a dummy variable value based on detected outlier observations, wherein said dummy variable assigner assigns "1" to outliers and "0" to normal observations; and a calculation unit to detect an anomaly based on said dummy variable values and said set of parameters.

2. The system of claim 1, wherein said calculation unit is configured to detect said anomaly
based on one or a combination of logistic regression model, classification tree model, and support vector machine classifier model, further wherein said dummy variable values are response variables, and wherein time and said set of parameters are explanatory variables.

3. The system of claim 1, wherein said parameters defining said user's mobility pattern comprise latitude, longitude, type of mobility, purpose of mobility, and duration of mobility.

4. The system of claim 1, wherein said parameters defining said user's device usage context comprise calling parameters, messaging parameters and profile parameters, wherein said calling parameters comprise incoming calls, missed calls, and outgoing calls, and wherein said messaging parameters comprise incoming SMS, spam SMS, outgoing SMS, incoming emails, outgoing emails, incoming MMS, and outgoing MMS, and wherein said profile parameters comprise reminders, calendar setting, and phone mode.

5. The system of claim 1, wherein said parameters defining said device behaviour comprise calling ring back tone, call settings, installed user applications, device settings, and usage pattern of installed applications.

6. The system of claim 1, wherein each of said one or more indexes represents its corresponding parameters as their principal component.

7. The system of claim 1, wherein said time series model unit is configured to compute an auto-correlation value for each observation of said index and compare said autocorrelation value with a threshold to determine whether the time series is stationary.

8. The system of claim 7, further comprising calculating differencing of said time series if the auto-correlation value is beyond said threshold.

9. The system of claim 1, wherein said outlier detection unit implements Box-Jenkins methodology to detect said outlier observations based on computation of residuals.

10. A method of detecting anomaly in a hand-held device comprising the steps of:

selecting a first set of parameters from one or more parameters stored in a database along with respective observations with respect to time, wherein said parameters are based on one or more of user's mobility pattern, device usage context, and device behaviour;

constructing one or more indexes based on said first set of parameters, wherein said step of constructing comprises associating index values with each of said first set of parameters;

fitting a time-series on said one or more indexes;

detecting outlier observations for each index based on said fitted time series model;

assigning each observation a dummy variable value based on detected outlier observations, wherein said dummy variable assigner assigns "1" to outliers and "0" to normal observations; and assessing an anomaly based on said dummy variable values and said set of parameters.

11. The method of claim 10, wherein said parameters defining said user's mobility pattern comprise latitude, longitude, type of mobility, purpose of mobility, and duration of mobility.

12. The method of claim 10, wherein said parameters defining said user's device usage context comprise calling parameters, messaging parameters and profile parameters, wherein said calling parameters comprise incoming calls, missed calls, and outgoing calls, and wherein said messaging parameters comprise incoming SMS, spam SMS, outgoing SMS, incoming emails, outgoing emails, incoming MMS, and outgoing MMS, and wherein said profile parameters comprise reminders, calendar setting, and phone mode.

13. The method of claim 10, wherein said parameters defining said device behaviour comprise calling ring back tone, call settings, installed user applications, device settings, and usage pattern of installed applications.

14. The method of claim 10, wherein the step of assessing anomaly further comprises the step of: detecting said anomaly based on one or a combination of logistic regression model, classification tree model, and support vector machine classifier model, further wherein said dummy variable values are response variables, and wherein time and said set of parameters are explanatory variables.

* * * * *